(12) United States Patent
Komachiya et al.

(10) Patent No.: US 6,418,260 B1
(45) Date of Patent: Jul. 9, 2002

(54) OPTICAL FIBER AND FIBER-OPTIC SENSING SYSTEM USING THE SAME

(75) Inventors: Masahiro Komachiya, Hitachi; Takao Miwa, Hitachinaka; Rintaro Minamitani, Tsukuba; Takayuki Fumino, Hitachinaka; Tatsunori Sakaguchi, Hitachinaka; Shizuhisa Watanabe, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/253,071

(22) Filed: Feb. 19, 1999

(30) Foreign Application Priority Data

Feb. 25, 1998 (JP) .............................................. 10-043365

(51) Int. Cl.$^7$ .............................. G02B 6/02; G02B 6/00
(52) U.S. Cl. ......................................... 385/128; 385/141
(58) Field of Search .................................. 385/128, 141, 385/145

(56) References Cited

U.S. PATENT DOCUMENTS 5,745,611 A    4/1998    Komachiya et al.

FOREIGN PATENT DOCUMENTS

| | | |
|---|---|---|
| DE | 41 03 327 A1 | 2/1991 |
| EP | 0 550 424 A2 | 1/1993 |
| EP | 99102805.1-2111 | 7/1999 |
| JP | 59-78954 | 5/1984 |
| JP | 1-119546 | 5/1989 |
| JP | A 1-173006 | 7/1989 |

OTHER PUBLICATIONS

Patent Abstracts of Japan Application 07120037 dtd May 18, 1995 from EPO.

Patent Abstracts of Japan Application 62333795 dtd Dec. 28, 1987 from EPO.

Knocking detection of a gasoline engine . . . ; Applied Optics vol. 37.No. 7; dtd Mar. 1, 1998; pp. 1152–1158.

Multiplex in–cylinder pressure . . . ; Applied Optics vol. 35.No. 7; dtd Mar. 1, 1996; pp. 1143–1150.

*Primary Examiner*—Frank G. Font
*Assistant Examiner*—Amanda Merlino
(74) *Attorney, Agent, or Firm*—Crowell & Moring LLP (57) ABSTRACT

An optical fiber comprising an optical fiber main body and a coat formed therearound and made from a polyimide resin obtained by using as an acid component a tetracarboxylic dianhydride having at least two benzene rings fused or bound directly or via an oxygen atom has excellent resistance to high temperature and high humidity and adhesiveness to the optical fiber main body, and useful in a sensing part in a fiber-optic sensing system comprising at least one sensing part and signal transmitting paths.

10 Claims, 5 Drawing Sheets

CRACK

OPTICAL FIBER AND FIBER-OPTIC SENSING SYSTEM USING THE SAME

BACKGROUND OF THE INVENTION

The present invention relates to an optical fiber, particularly an optical fiber capable of standing use in the high-temperature and high-humidity environments, and a fiber-optic sensing system using such an optical fiber.

Optical fiber, in practical use thereof, is usually provided with a protective coat for such purposes as prevention of failure and improvement of handling qualities of the fiber. For instance, fused silica optical fiber produced from fused silica is subject to easy failure for a small crack if it is left uncoated, but secure coating of the fiber in its manufacturing process allows its wide-ranging use for communication. UV-curable acrylic resins and some other types of resins are known as effective coating materials for the optical fiber. In some applications, different types of resins are coated in layers on the fiber. Generally, polymer coating, in virtue of its moderate softness, is capable of mitigating the influence of pressure exerted to the side of the optical fiber to reduce mechanical damage to the optical fiber main body.

On the other hand, the field of application of the currently available optical fiber is not confined to use in the ordinary environments; request is rising for utilization of the optical fiber in more severe environments. Such demand for extended utilization of the optical fiber is notable not only in the field of communication but equally in the fields where it is applied as a sensor. In such applications, the coating material used for optical fiber will also be required to have specific properties malleable to the ambience of use.

For instance, in applications where the optical fiber is destined to be used in a high-temperature environment for a long time, polyimide resin obtained from pyromellitic dianhydrde, known as a typical coating material having heat resistance, is used for coating in a thickness of 25–300 μm (JP-A-1-173006). Since polyimdie resin can withstand heat of up to about 300° C., it can well be applied as a heat-resistant material in all the fields excepting certain very specific applications. The polyimide resin, however, because of its chemical structure shown below, has a problem in that when used in a high-temperature and remarkably high-humidity environment for a long period of time, cracks may develop in the coat to make it unable to protect the optical fiber or give damage to the optical fiber main body to cause failure of the fiber:

(VI)

wherein $R_3$ is a divalent organic group having 2 or more carbon atoms, and m is an integer of 1 or greater.

The optical fiber coated with said polyimide resin involves a problem in that adhesion between the polyimide coat and the optical fiber is hard to secure. Therefore, long-time use of such polyimide-coated optical fiber in an environment of high temperature and remarkably high humidity may cause condensation of moisture in the spaces between the polyimide coat and the optical fiber. Particularly in the case of fused silica optical fiber, presence of such moisture encourages growth of the microcracks in the fiber surface, which may end up with failure of the optical fiber.

BRIEF SUMMARY OF THE INVENTION

An object of the present invention is to solve the foregoing problems of the prior art and to provide an optical fiber capable of standing long-time use even under remarkably severe conditions of high-temperature and high-humidity previously not applied, and a fiber-optic sensing system with high sensitivity and reliability using such an optical fiber.

The present invention provides an optical fiber comprising an optical fiber main body and a coat formed therearound, said coat being made from a polyimide resin obtained by using as its acid component a tetracarboxylic dianhydride in which at least two benzene rings are fused or bound directly or via an oxygen atom.

The present invention is also envisaged to provide a fiber-optic sensing system comprising signal transmitting paths for transmitting input and output light signals and made from an optical fiber, and at least one sensing part, wherein the input light signal is changed according to the object to be measured to issue an output light signal, said optical fiber in said signal transmitting path having a protective layer thereon, said sensing part being constructed using an optical fiber having no protecting layer, and at least said optical fiber in the sensing part being the one coated with said polyimide resin.

DETAILED DESCRIPTION OF THE INVENTION

The optical fiber according to the present invention comprises an optical fiber main body and a coating material formed around the main body, said coating material being a polyimide resin obtained by using as an acid component a tetracarboxylic dianhydride having at least two benzene rings fused or bound directly or via an oxygen atom.

The optical fiber main body used in the present invention may, for instance, be the one which is principally composed of silicon dioxide ($SiO_2$) and has a core cladding structure.

As the coating polyimide resin, those obtainable by using as an acid component a tetracarboxylic dianhydride having two benzene rings fused or bound directly or via an oxygen atom can be used. Examples of the tetracarboxylic dianhydrides usable in this invention include:

3,3',4,4'-biphenyltetracarboxylic dianhydride,
2,2',3,3'-biphenyltetracarboxylic dianhydride,
bis(3,4-dicarboxyphenyl)ether dianhydride,
bis(2,3-dicarboxyphenyl)ether dianhydride,
naphthalene-2,3,6,7-tetracarboxylic dianhydride,
naphthalene-1,2,4,5-tetracarboxylic dianhydride,
naphthalene-1,4,5,8-tetracarboxylic dianhydride, and
naphthalene-1,3,5,6-tetracarboxylic dianhydride,
of which 3.3',4,4'-biphenyltetracarboxylic dianhydride is preferred.

As the diamine component, the conventionally used diamines can be used, with aromatic diamines being preferred. Examples of such aromatic diamines include:
p-phenylenediamine,
o-phenylenediamine,
diaminotoluene,
2,4-diaminotoluene,
4,4'-diaminodiphenylmethane,
benzidine,
3,3'-dimethylbenzidine,
3,3'-dimethoxybenzidine,
4,4'-diaminodiphenyl sulfide,
3,3'-diaminodiphenyl,
4,4'-diaminodiphenyl ether,
1,4-diaminonaphthalene,
1,5-diaminonaphthalene,
4,4'-diaminodiphenylsulfone,
4,4'-diaminodiphenylmethane,
4,4'-diaminodiphenylsulfide,
4,4"-diamino-terphenyl,
4,4"-diaminodicyclohexylmethane,
1,5-diaminonaphthalene,
4,4'-bis(para-aminophenoxy)biphenyl,
4,4'-bis(meta-aminophenoxy)diphenylsulfone,
2,2-bis{4-(para-aminophenoxy)phenyl}propane,
3,3'-dimethyl-4,4'-diaminodiphenylmethane,
2,5-diaminotoluene,
2,3-diaminopyridine,
3,4-diaminopyridine,
4,4'-diaminobenzophenone,
4,4'-bis(para-aminophenoxy)diphenylsulfone,
benzoquanamine,
2,7-diaminonaphthalene,
3,4-diaminotoluene,
meta-xylylenediamine,
para-xylylenediamine,
ortho-tolidine,
para-phenylenediamine,
2,4-diaminotoluene,
4,4'-diaminodiphenyl ether,
2,7-diaminofluorene,
acetoguanamine,
3,3'-dimethoxybenzidine,
meta-phenylenediamine,
2,2-bis{4-(para-aminophenoxy)phenyl}hexafluoropropane,
2,6-diaminoanthraquinone,
1,4-diaminodurene,
2,6-diaminotoluene,
2,5-diaminopyridine, and
2,6-diaminopyridine.

The acid anhydride component and the diamine component, such as mentioned above, are reacted in a normally used solvent to form a poly(amic acid) (varnish), and this varnish is thinly coated like a film on the base optical fiber and heat treated, whereby a polymerization reaction is allowed to proceed and a coating film of a polyimide having the following repeating units is formed:

wherein R' is a tetravalent organic group; $R_1$ is a divalent organic group; and n is an integer of 1 or greater. The polyimide resin properties are dependent on the R' in the acid component and $R_1$ in the diamine component.

Focusing on R' in particular, the present inventors have made comparative examinations of the polyimide resins varied in acid anhydride component and, as a result, found that those of the polyimide resins which assume the chemical structure of the formula (I) shown below after the synthesis and cured as an optical fiber coating have remarkably high heat resistance. More specifically, when biphenyltetracarboxylic acid dianhydride was used as acid anhydride, both high heat resistance and high water resistance could be obtained. On the other hand, use of pyromellitic dianhydride posed problems in water resistance and crack resistance, while use of benzophenonetetracarboxylic acid presented problems in water resistance and adhesion.

wherein $R_1$ is a divalent organic group, e.g. a $C_6$–$C_{18}$ aromatic group; and n is an integer or 1 greater. It is especially preferred that $R_1$ be a group of the following formula (II):

because of improvement of crack resistance and durability of the produced optical fiber.

Use of such a polyimide resin realizes improvement of heat resistance as well as water resistance of the optical fiber. It is to be also noted that when the principal component of the optical fiber main body is silicon dioxide ($SiO_2$) and the polyimide coat thereon contains a siloxane compound having a chemical structure of the following formula (III), adhesion of the coat to the silicon-containing optical fiber body is improved, and its effect on the prevailing silica fiber is remarkable. Also, there is no need of conducting a pre-treatment on the optical fiber main body in the production line.

(III)

wherein $R_2$ is an alkyl group having 6 or less carbon atoms, and p is an integer of one 1 or greater.

It is especially preferable when the siloxane compound has a chemical structure of the following formula (IV) or (V):

(IV)

wherein $R_5$ is a $C_1$–$C_6$ alkyl group; $R_4$ is a $C_2$–$C_{18}$ alkylene group or a $C_6$–$C_{18}$ aromatic group; and q is an integer of 1 or greater.

(V)

wherein $R_6$ is a $C_2$–$C_{18}$ alkylene group or a $C_6$–$C_{18}$ aromatic group; $R_7$ is a $C_1$–$C_6$ alkyl group; and r is an integer of 1 or greater.

As described above, the optical fiber of the present invention is improved in heat and water resistance as well as in adhesion between the fiber body and the coat, so that it can stand long-time use in a high-temperature and high-humidity environment. Further, since the polyimide resin coat can be formed to a thickness of 3–22 μm, preferably 4–20 μm, more preferably about 10–15 μm, it has no possibility of exerting any adverse effect on the innate qualities such as sensing performance of the optical fiber per se.

The fiber-optic sensing system according to the present invention comprises signal transmission paths for transmitting input and output light signals and made from an optical fiber, and at least one sensing part, wherein the input light signal is changed according to the object to be measure to issue an output light signal, said optical fiber in said signal transmitting path having a protective layer thereon, said sensing part being constructed using an optical fiber having no protective layer, and at least said optical fiber in the sensing part being the one coated with said polyimide resin.

An ordinary overcoat comprising an acrylic or other type of resin is helpful for preventing damage to the optical fiber and facilitates its handling, so that such an overcoat is widely used for the optical fibers for transmission, but it reduces sensing performance of the optical fiber. Said protective layer may be of a more solid cable-like structure.

Said sensing part may be constructed to serve as a pressure sensor by incorporating an optical fiber having no protective layer so as to produce a bend deformation corresponding to the pressure in the object to be measured.

The fiber-optic sensing system may be of a construction in which said sensing part is a pressure sensing part formed in a closed space communicated with an internal combustion engine cylinder, and each pressure sensing part housed in each cylinder and the signal transmitting path connecting each pressure sensing part are installed in a head gasket to detect the pressure in each cylinder through said signal transmitting path.

Said sensing part may be designed to serve as a temperature sensor by disposing the unsheathed optical fiber in such a manner that the light signal will receive Raman scattering in accordance with the temperature in the object to be measured, and two kinds of scattered light from said sensing part is detected from the signal transmitting path via an optical coupler.

According to the fiber-optic sensing system of the present invention, the sensing part is constructed by disposing the optical fiber of this invention without protective layer in an object to be measured which may be placed in a high-temperature and high-humidity environment, so that this sensing part is capable of long-time use even under the harsh conditions of high temperature and high humidity.

Embodiments of the optical fiber and fiber-optic sensing system according to the present invention will be explained more particularly with reference to the accompanying drawings.

Figure 1:
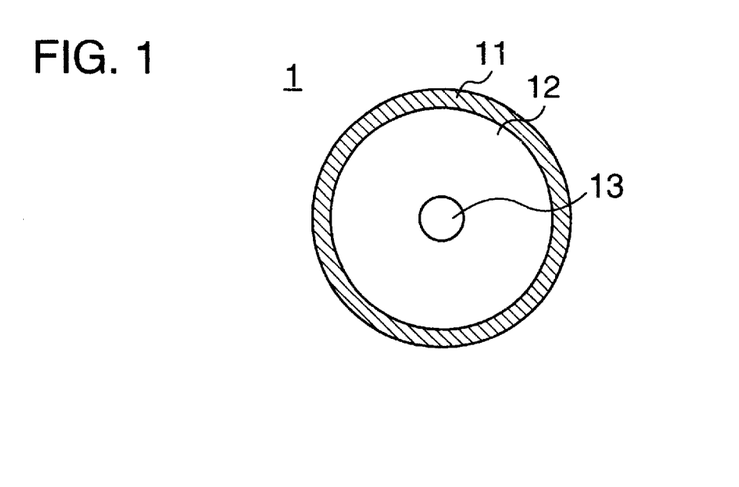
FIG. 1 is a sectional view showing an example of the optical fiber according to the present invention.

First, embodiments of the optical fiber according to the present invention are explained. Referring to FIG. 1, there is shown a sectional view of an optical fiber according to the present invention. Optical fiber core 13 and its cladding 12 are mainly composed of fused silica. Optical fiber coat 11 is made of a polyimide resin having the chemical structure of the formula (I) wherein $R_1$ is a divalent organic group having 2 or more carbon atoms, and n is an integer of 1 or more. The polyimide resin of the present invention is characterized by its structure having two benzene rings bound to each other in contrast to the conventional polyimide structure of the formula (VI), and has better water resistance and higher adhesion to the optical fiber body than the conventional polyimides.

An example of the manufacturing process of the optical fiber according to the present invention will be explained. First, a fused silica preform having a required profile of refractive index is prepared, and it is then heated and drawn out into a fine optical fiber having an outer diameter of about 125 microns. By this operation, both core 13 and cladding 12 are formed at the same time (see FIG. 1). The drawn-out optical fiber body is passed through a poly(amic acid) solution filled in a die. On leaving the poly(amic acid) solution, the optical fiber is heat treated as it is further passed, for a prescribed period of time, through a heating furnace kept at a temperature necessary for effecting imidization while vaporizing the solvent.

The above procedure produces a polyimidecoated fused silica optical fiber. The coat thickness depends on the concentration and viscosity of the poly(amic acid) solution, and more preferably it is around 10–15 microns, e.g. 12 μm obtained by repeated coating. The solvent is properly adjusted to provide a low viscosity for forming a thin coat or to provide a high viscosity for forming a thick coat. Needless to say, when a particularly thick coat is required, polyimide coating and heat treatment may be repeated to form a multi-layer coat.

Since the manufacturing process of the optical fiber according to the present invention is not much different from the conventional procedure, there is no need of making large alterations in manufacturing equipment. The polyimide coat curing temperature is also much the same as in the prior art practice. It is variable depending on the time used for passing the optical fiber through the treating means, but may, for instance, be set at between around 250° C. and 300° C. In case no sufficient curing can be attained by passing the optical fiber only once through the heating furnace, it is possible to effect satisfactory curing by again passing the once taken up optical fiber through the heating furnace alone.

The optical fiber of the present invention is characterized by its coating material, and the construction of its body portion is free to choose. The optical fiber of this invention can be used not only as a single mode or multi-mode optical fiber shown in FIG. 1 but also as optical fibers of specific constructions such as polarization plane preserving optical fiber.

In another embodiment of the optical fiber coating material according to the present invention, a siloxane compound of the formula (III) wherein $R_2$ is a monovalent organic group, e.g. a $C_1$–$C_6$ alkyl group, and p is an integer of 1 or more, is added to a polyimide resin of the formula (I).

The body portion (main body) of the optical fiber according to the present invention is composed of fused silica whose principal component is silicon dioxide ($SiO_2$), so that silicon (Si) of the siloxane compound in the coating composition and silicon (Si) in the fused silica optical fiber seem to be bound to each other via oxygen (O) to amazingly enhance adhesion of the coat to the optical fiber main body. An experimental result shows an almost double-figure improvement of peel strength in comparison with the polyimides of the conventional structures.

Addition of said siloxane compound is preferable so long as not damaging the innate properties of the optical fiber used. It should be noted that if adhesion of the coat is too strong, its compression on the optical fiber main body is varied to cause a change of the properties of the optical fiber itself, such as its extinction factor for polarized light. Therefore, when a siloxane compound is added as an acid anhydride or diamine component of the polyimide precursor, its amount should be limited to a range not exceeding 20%, preferably not exceeding 10% of the total amount of resin.

Examples of the siloxane compounds usable for said coating material include diaminosiloxanes of the formula (IV) or (V) wherein $R_4$ and $R_6$ are a divalent organic group, e.g. a $C_2$–$C_{18}$ alkylene group; $R_5$ and $R_7$ are a monovalent organic group, e.g. a $C_1$–$C_6$ alkyl group; and q and r are an integer of 1 or greater.

It is also possible to use siloxane-containing acid anhydrides, such as bis (3,4-dicarboxyphenyl-dimethylsilyl) ether anhydride. If necessary, a commercially available silane coupling agent may be added to the siloxane compound. In this case, it is desirable that the amount of the additive does not exceed 10% by weight of the amount of the base resin.

The siloxane compound-containing polyimides of the formula (I) according to the present invention can also be coated on the optical fiber main body by a conventional method. In this case, since a material acting to enhance adhesion is contained in the polyimide resin solution, there is no need of applying pretreatments on the optical fiber in the production line.

Figure 2A:
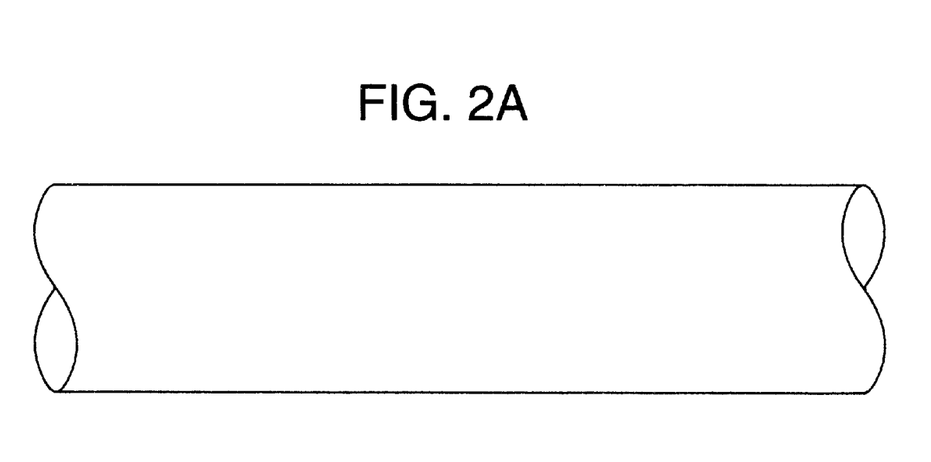
FIGS. 2A and 2B are illustrations showing external appearance of the optical fiber in an embodiment of the present invention (2A) and a conventional optical fiber (2B) after a high-temperature and high-humidity test.
Figure 2B:
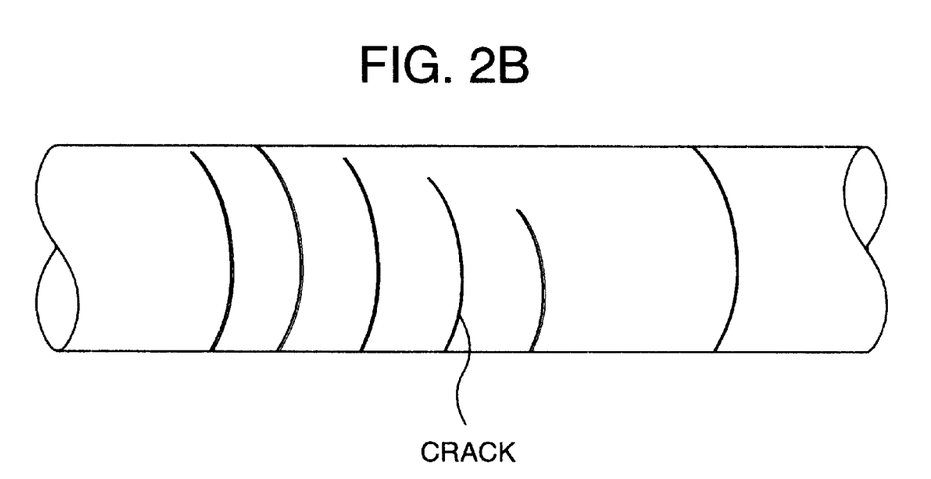

Referring now to FIGS. 2A and 2B, there are shown the results of a property test conducted on an optical fiber of the present invention (2A) and on a conventional optical fiber (2B). The test was conducted by leaving each bent optical fiber in a high-temperature (85° C.) and high-humidity (85% RH) environment for 1,000 hours. The enlarged states of the optical fiber surfaces after the test are shown in the figures visually. FIG. 2A shows the external appearance of an optical fiber coated with a polyimide resin of the formula (I) wherein the organic group $R_1$ has the structure of the formula (II). No abnormality is seen on the coat surface. FIG. 2B shows the surface appearance of an optical fiber coated with a conventional polyimide. Many cracks are observed in the coat surface after the test under severe circumstances.

When fused silica, which is an inorganic matter, and a diamine, which is an organic matter, are unified, it is generally desirable that they are as much close to each other as possible in coefficient of thermal expansion. For instance, when p-phenylenediamine is used as diamine component, it is known that the thermal expansion coefficient of the polyimide becomes 3 ppm/° C., which is close to that of fused silica (Polymer Engineering and Science, Vol. 28, page 906, 1988).

In polyimide coating in the optical fiber production line, however, the polyimide is cured by conducting wire drawing in a far shorter time than the ordinary heating time (longer than one hour) because, in the case of optical fiber, unless it is drawn at a rate of 10–20 m/min or higher, the fiber tends to become non-uniform in outer diameter. Therefore, when a polyimide containing a diamine selected by giving priority to the coefficient of thermal expansion is used as coating material, it often proves impossible to effect normal curing. For instance, the coating material is deposited only in a powdery state due to a delicate change of temperature of the heating furnace. In contrast, the polyimides having the chemical structure of the formula (II) show excellent adhesion properties in high-speed drawing although their coefficient of thermal expansion becomes greater (45 ppm/° C.) than that of fused silica.

Examples of the synthesis of polyimide resins usable as optical fiber coating material in the present invention will be explained. In the Examples shown below, the following abbreviations are used.

DDE: 4,4'-diaminodiphenyl ether
NMP: N-methyl-2-pyrrolidone
s-BPDA: 3,3',4,4'-bisphenyltetracarboxylic dianhydride
LP: 1,3-bis(γ-propyl)-1,1,3,3-tetramethyldisiloxane
PMDA: pyromellitic dianhydride

Synthesis Example 1

In a 500-ml four-necked flask equipped with a thermometer, a calcium chloride tube, a stirring rod and a nitrogen blow-in port, 30.4 g of DDE and 425 g of NMP were supplied and stirred while blowing nitrogen thereinto at a rate of approximately 100 ml/min to dissolve DDE. This solution, while cooled to a temperature below 10° C. with a water bath, was polycondensed by slowly adding 44.6 g of s-BPDA to form a viscous poly(amic acid), and it was cooked at 85° C. until the viscosity of the compound, measured by a rotary viscometer, became about 50 P (poises).

Synthesis Example 2

In a 500-ml four-necked flask equipped with a thermometer, a calcium chloride tube, a stirring rod and a nitrogen blow-in port, 28.7 g of DDE, 1.90 g of LP and 425 g of NMP were supplied and stirred while blowing nitrogen thereinto at a rate of approximately 100 ml/min to dissolve DDE and LP. This solution, while cooled to a temperature below 10° C. with a water bath, was polycondensed by slowly adding 44.4 g of s-BPDA to prepare a viscous poly(amic acid), and it was cooked at 85° C. until the viscosity of the compound, measured by a rotary viscometer, became about 50 P (poises).

A conventional method for the synthesis of polyimides for optical fiber is shown below as a Comparative Example.

Comparative Example

In a 500-ml four-necked flask equipped with a thermometer, a calcium chloride tube, a stirring rod and a nitrogen blow-in port, 35.9 g of DDE and 425 g of NMP were supplied and stirred while blowing nitrogen thereinto to dissolve DDE. This solution, while cooled to a temperature below 10° C. with a water bath, was polycondensed by slowly adding 39.1 g of PMDA to prepare a viscous poly (amic acid), and it was cooked at 85° C. until the viscosity of the compound, measured by a rotary viscometer, became about 50 P.

A comparison in quality of the optical fibers coated with the polyimides according to the two Synthesis Examples of the present invention and the conventional polyimide is shown in Table 1.

TABLE 1

| Polyimide used in optical fiber | Water resistance of optical fiber | Coating adhesion ** |
|---|---|---|
| Polyimide according to Synthesis Example 2 | No abnormality | 50–100 |
| Polyimide according to Synthesis Example 1 | No abnormality | 1 |
| Polyimide according to Comparative Example | Surface was cracked | 1 |

* Bending test at 85° C. and 85% RH for 1,000 hours.
** Relative value of peel strength against glass surface (in atmospheric air).

As is seen from Table 1, the optical fibers coated with the polyimides according to Synthesis Example 1 and Synthesis Example 2 remained free of abnormalities such as cracking in the coat throughout the high-temperature (85° C.) and high-humidity (85% RH) 1,000-hour bending test, which confirmed both heat resistance and water resistance of these optical fibers. Further, when the siloxane compound-containing polyimide according to Synthesis Example 2 was used, peel strength of the optical fiber was improved almost two figures over the conventional optical fiber.

Figure 3:
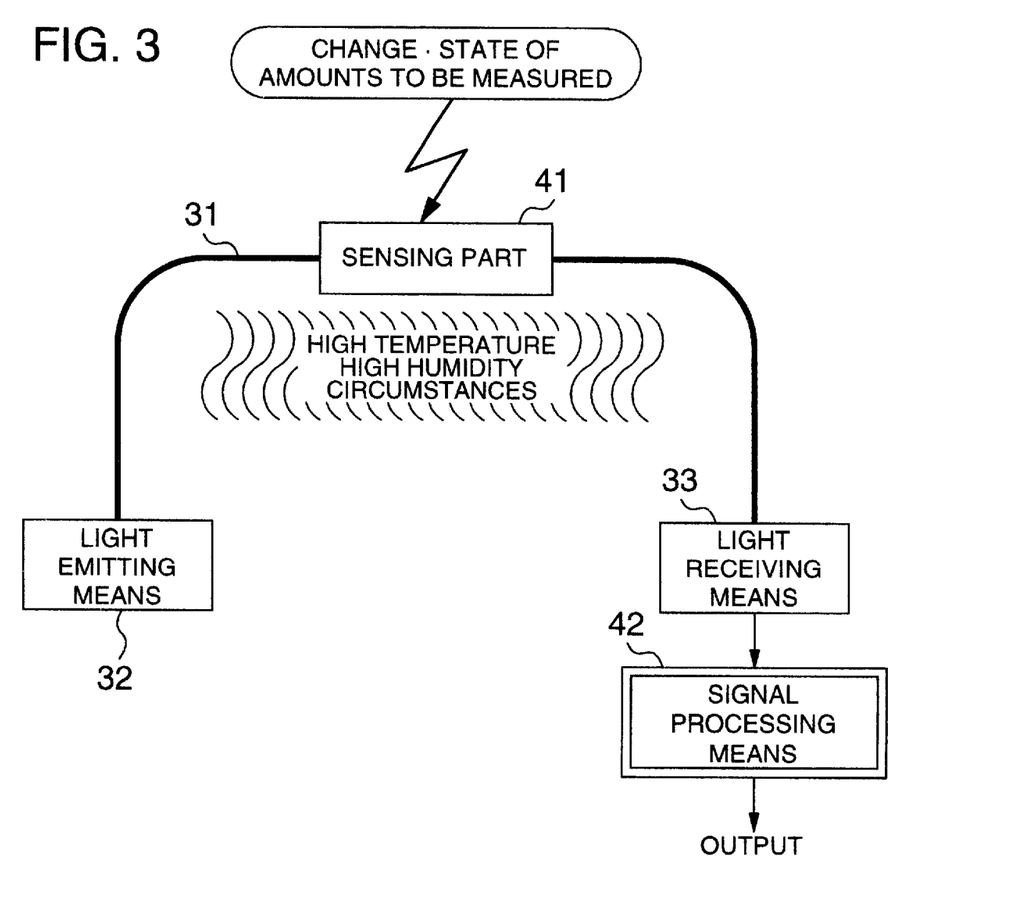
FIG. 3 is a diagrammatic illustration of the basic construction of the fiber-optic sensing system according to the present invention.

Next, embodiments of the fiber-optic sensing system according to the present invention will be explained. FIG. 3 illustrates a block diagram of a fiber-optic sensing system according to the present invention. The light signal issued from the light emitting means 32 is transmitted through the optical fiber to the signal sensing part 41 where the signal undergoes changes of optical power, etc., in compliance with the change or state of measurements. The light signal which received these changes is detected by the light receiving means 33 and converted into an electric signal corresponding to said changes. The electric signal is processed by the signal processing means 42 to extract information relating to the change or state of measurements.

In the fiber-optic sensing systems using optical fiber, the change or state of measurements, which is the object to be measured, is detected as a change of light phase, state of polarization, frequency (wavelength) or power or a combination thereof. For instance, in the case of temperature sensor, the strength of scattered light of Raman scattering received by the light pulse passed through the optical fiber is measured to determine temperature. In Raman scattering, two types of light, one with a higher frequency than the incident light and the other with a lower frequency than the incident light, are scattered. The temperature at a point of measurement (scattering point) can be known since the ratio in strength of the two types of light is dependent on temperature.

Thus, in the fiber-optic sensing system where the optical fiber serves as a point of measurement, the light signal passing through the optical fiber is changed with the temperature or pressure in the object to be measured being reflected in the change of sensing performance of the optical fiber. In order to secure detection sensitivity in this mechanism, it is necessary to leave the optical fiber at the point of measurement exposed to the object to be measured with no recoating or sheath thereon, so that there was a problem in reliability of the optical fiber in use in a high-humidity environment.

The fiber-optic sensing system of the instant embodiment of the present invention features the mechanism of the sensing part 41 which makes it possible to prevent damage by moisture in the object to be measured in a high-temperature and high-humidity environment. More specifically, the optical fiber of the present invention coated with a polyimide resin of the formula (I) is used with no recoating or sheath at least at the sensing part 41. However, the optical fiber 31 of the other parts is protected with a sheath or has a cable-like structure.

Since the optical fiber constituting the sensing part 41 has excellent heat and moisture resistance, even if moisture is penetrated to reach the bare (i.e. non-recoated or unsheathed) optical fiber of the sensing part, it is possible to exclude or minimize the danger of failure of the optical fiber for a long time by maintaining its detection sensitivity. Also, since the optical fiber of the other parts is protected, as by recoating or sheathing, it is possible to make the handling of the optical fiber at the time of wiring, and to secure reliability and handling qualities of the system.

Figure 4:
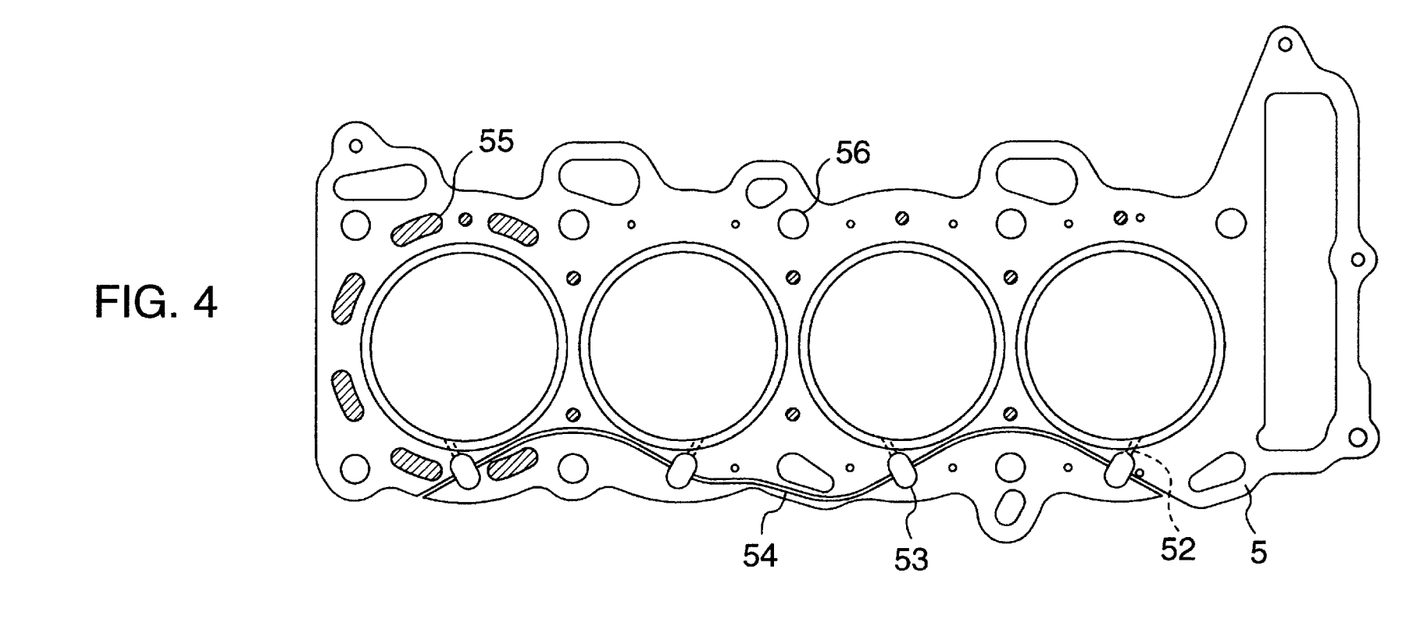
FIG. 4 is a sectional view of a head gasket packaged with an in-cylinder pressure sensor in an engine.

Another embodiment of the fiber-optic sensing system according to the present invention will be explained. First, an in-cylinder pressure sensor for an internal combustion engine is illustrated. FIG. 4 shows the structure along a section of a head gasket in an engine. Each of the cylinders 51 in the head gasket is connected via a bypath 52 to a pressure receiving part 53 where the combustion pressure in the corresponding cylinder is measured, and the optical fiber for sensing is set in a groove 54 which communicates the pressure receiving parts 53. The operating principle of the in-cylinder pressure sensor is described in Applied Optics, Vol. 35, No. 7, pp. 1143–1150 (1996), the disclosure of which is hereby incorporated by reference.

Installation of such an in-cylinder pressure sensor in the gasket facilitates securement of the required space in the engine room, but on the other hand it gives rise to a problem in durability of the sensor. Since the gasket 5 is exposed to a high temperature of around 100° C. in operation, the cooling water passages 55 are provided for cooling the gasket. Therefore, in long-time use of the gasket, there is almost no risk of cooling water infiltration into the surroundings of the optical fiber due to certain causes such as deterioration of the gasket or loosening of the bolts 56, creating a high-temperature and high-humidity ambience around the pressure receiving parts 53, but not completely zero.

Figure 5:
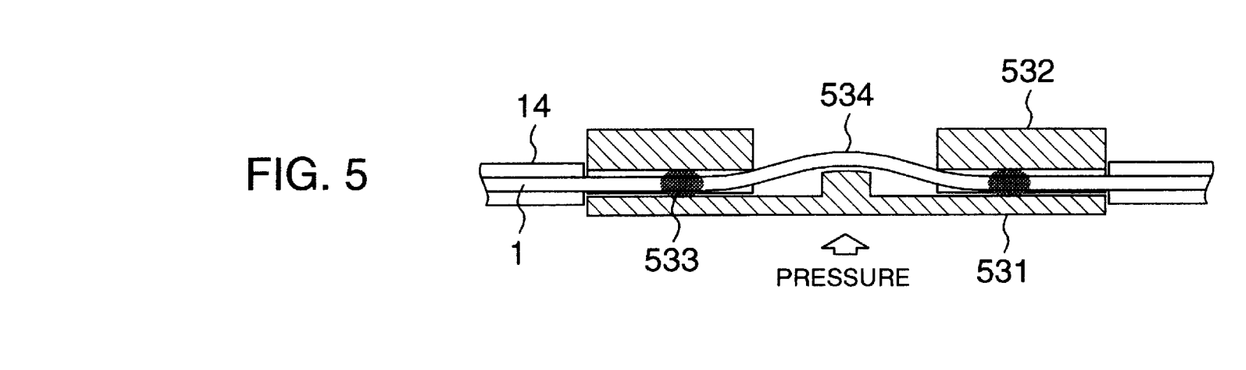
FIG. 5 is a sectional view showing the construction of the pressure receiving part of an in-cylinder pressure sensor.

FIG. 5 schematically illustrates the construction of an in-cylinder pressure sensor according to the instant embodiment of the present invention. In the pressure receiving part 53, the optical fiber 1 is held by a resin 533 between a diaphragm 531 and a hold-down plate 532 to constitute a point of measurement 534. The optical fiber 1 outside of the pressure receiving part 53 has recoating or a sheath 14, but its portion at the point of measurement 534 in the pressure receiving part 53 is devoid of such sheathing and only has the coat 11 shown in FIG. 1. Recoating or sheath 14 is provided for the purpose of facilitating handling and protection of the optical fiber 1, and, for instance, an acrylic UV-curable resin is used therefor. If the space permits, a more perfect protection may be provided by using a sheath or by employing a cable-like structure.

In the pressure receiving part 53 of this construction, the diaphragm 531 rises up and down in accordance with the combustion pressure in the cylinder to change the bending radius of the optical fiber 1. This causes a corresponding change of loss of the light signal passing through the optical fiber 1, so that the change of combustion pressure can be measured as a change of the quantity of passing light. (See Applied Optics, vol. 35, no. 7, pp. 1143–1150 (1996)).

If an optical fiber having recoating or sheath 14 is used for the point of measurement 534 as in the prior art, no sharp change of form of the optical fiber can be obtained. There is a case, for instance, where it is desired to measure a minute pressure fluctuation (knocking) of about 15 kHz incidental to abnormal combustion, by a combustion pressure sensor. In the prior art, however, such a minute fluctuation was difficult to measure as it will be absorbed by the recoating or sheath, making it unable to obtain an effective change of form of the optical fiber.

In contrast, according to the in-cylinder pressure sensor in the instant embodiment of the present invention, the optical fiber at the point of measurement has only a thin polyimide coat of approximately 10 microns, so that there is no probability of such a coat impairing the sensing performance of the optical fiber main body (fused silica fiber). Experimentally, detection and measurement of said minute knocking was confirmed, and it was possible to realize a high-sensitivity pressure sensor.

Further, since the polyimide coat of the present invention secures water resistance and coating adhesion in addition to heat resistance of the optical fiber, the optical fiber of the present invention is capable of standing long-time use at the pressure receiving part which, in use, is placed under high temperature and directly undergoes variation of pressure and which also has a possibility of suffering water leakage in long-time use. It is especially desirable for structural reason that the in-cylinder pressure sensor installed in a gasket be maintenancefree. The optical fiber according to the instant embodiment of the present invention is capable of securing reliability of the sensor through long-time use of the gasket.

Figure 6:
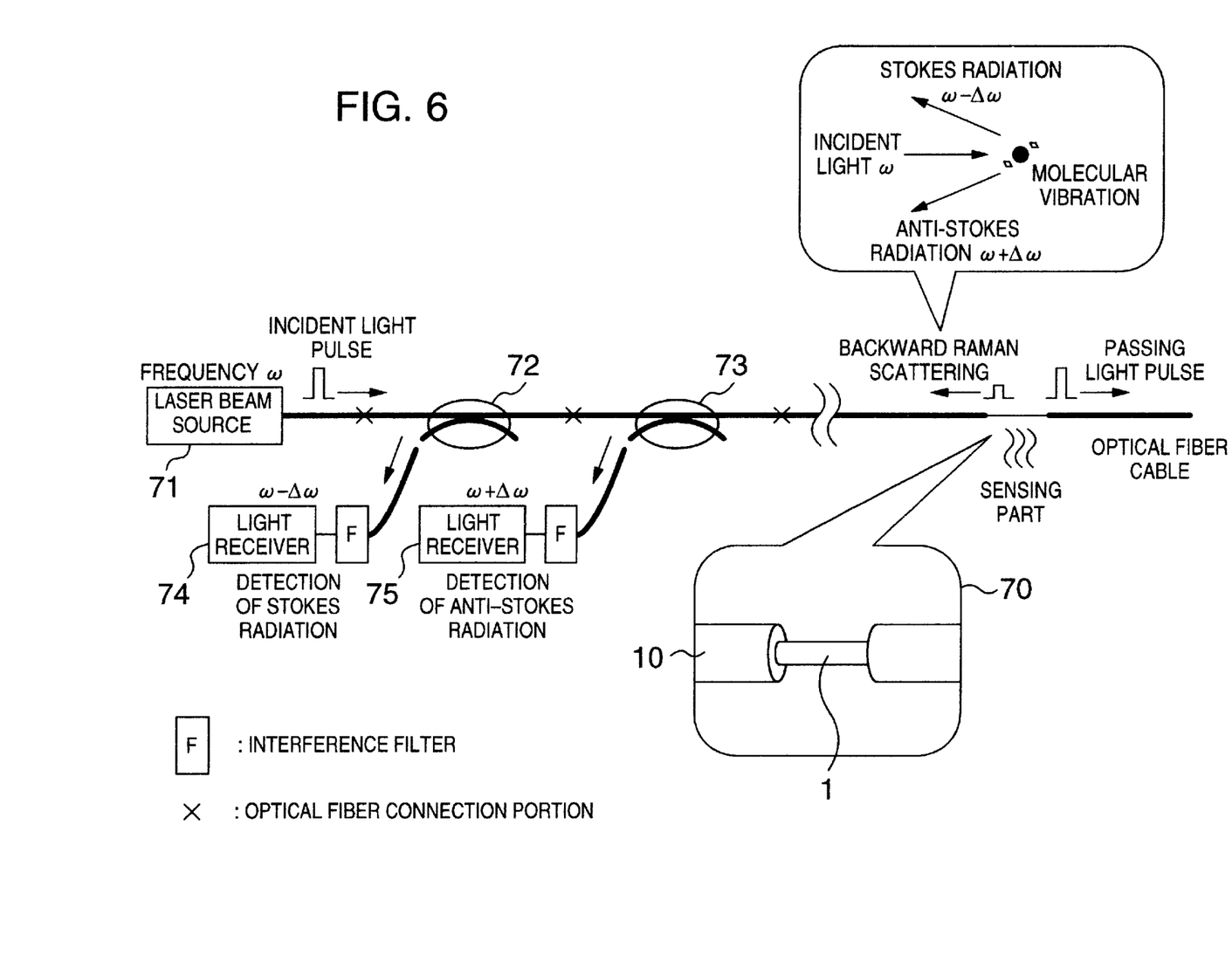
FIG. 6 is a schematic block diagram illustrating a mode of practice of the optical fiber-made temperature sensor.

The following is still another embodiment of the fiber-optic sensing system according to the present invention. FIG. 6 shows a basic layout of a temperature sensor using the optical fiber in the instant embodiment. The incident light pulse transmitted to the optical fiber from a laser beam source 71 (frequency: ω) reaches the temperature sensing part 70 where, upon the occurrence of Raman scattering, the light pulse is now transmitted backwards in the optical fiber, branched off at the photo-couplers 72, 73 and detected by the photo-detectors 74, 75. In Raman scattering, two types of light, one with a higher frequency and the other with a lower frequency than the incident light, are scattered, so that at each of the photo-couplers 74, 75, one type of light is detected through an interference filter F, and the temperature at the point of measurement (scattering point) is determined from the ratio in strength of the two types of light. Since the positions of the points of measurement along the optical fiber can be detected from the return time of scattered light corresponding to the incident light pulse, it is possible to provide plural points of measurement on a single transmission path.

A prominent feature of the temperature sensor according to the instant embodiment of the present invention resides in the construction of the sensing part 70. This sensing part comprises the optical fiber 1 disposed at the point of measurement, where the light-transmitting optical fiber cable 10 is striped of the sheath to expose the optical fiber 1. At least the exposed portion of the optical fiber 1 is identical with the above-described optical fiber of the present invention.

The optical fiber 1 in this sensing part merely has a thin polyimide coat of about 10 microns in thickness, which has both heat resistance and moisture resistance, so that this optical fiber is capable of maintaining time responsiveness to the change of ambient temperature and has good detection sensitivity. If the optical fiber cable 10 is used as is for the sensing part 70, heat capacity of the cable itself becomes injurious to detection sensitivity.

Figure 7:
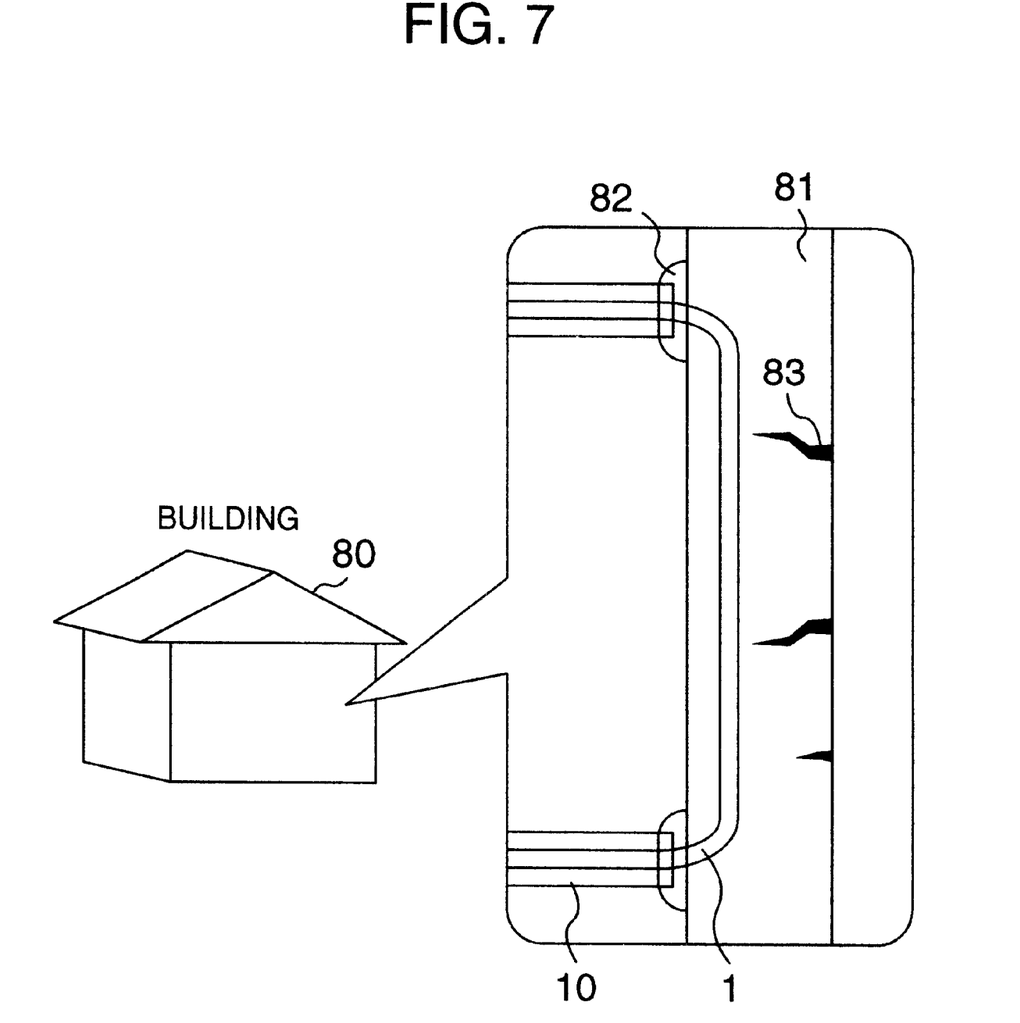
FIG. 7 is an illustration showing an example of application of the optical fiber-made temperature sensor.

FIG. 7 illustrates an instance of application of the optical fiber temperature sensor according to the instant embodiment of the present invention. Here, the temperature sensor is applied as a fire detector having its sensing part embedded in a wall 81 of a building 80. As shown in the drawing, the optical cable 10 is used in the area outside of the wall 81 while the unsheathed optical fiber 1 is laid in the inside of the wall to constitute a sensing part. A protective cap 82 for sealing is provided at every junction of the optical cable 10 and the optical fiber 1.

With the sensing part embedded, for instance, directly in a wall of a cooking room where a fire is likely to take place, the optical fiber is capable of quickly detecting a change of temperature consequent on the occurrence of a fire. It can also prevent false operations due to various noise signals or damage by rats. On the other hand, maintenance becomes difficult, and there is also a possibility that water might infiltrate into the sensing part from a crack 83 formed in the wall surface exposed to the weather. In the instant example of application, however, since an optical fiber 1 with excellent water resistance is used in the sensing part, there is provided a fire detector which is resistant to crack in the surface, maintenance-free for a prolonged period of time and also high in reliability.

The optical fiber of the present invention has a coat of, for instance, a polyimide resin having the structure of the formula (I), so that it is improved in both heat resistance and water resistance. Also, since the coating material contains a siloxane compound represented by one of the formulae (III) to (V), the optical fiber of this invention shows notably higher coating adhesion than the conventional fused silica fiber whose main component is $SiO_2$.

The fiber-optic sensing system according to the present invention comprises a sensing part constituted by placing the optical fiber of the present invention having no protective layer (such as recoating or sheath) in the object to be measured, so that it is possible to maintain sensing performance of the optical fiber unchanged, to prevent damage to the sensing part even when the object to be measured is in a high-temperature and high-humidity environment, and to thereby secure long-lasting reliability.

What is claimed is:

1. A fiber-optic sensing system comprising signal transmitting paths for transmitting input and output light signals and made from an optical fiber having at least one sensing part comprising an optical fiber main body and a coating material formed around the main body, said coating material being a polyimide resin obtained by using as an acid component a tetracarboxylic dianhydride having at least two benzene rings fused or bound directly or via an oxygen atom, wherein an input light signal is changed depending on an object to be measured to obtain an output light signal, said optical fiber in said signal transmitting path having a protective layer thereon in the form of sheath or cable-like structure, and wherein said sensing part is constructed using an optical fiber having no protecting layer so as to be exposed to an object to be measured.

2. A fiber-optic sensing system according to claim 1, wherein the polyimide resin has repeating units of the formula:

(I)

wherein $R_1$ is a divalent organic group having 2 or more carbon atoms; and n is an integer of 1 or more.

3. A fiber-optic sensing system according to claim 1, wherein the optical fiber main body is made from silicon dioxide as a main component, and the coating material further comprises a siloxane compound having a structure of the formula:

(III)

wherein $R_2$ is a monovalent organic group; and p is an integer of 1 or more.

4. A fiber-optic sensing system according to claim 3, wherein the siloxane compound is represented by the formula:

or
(IV)

(V)

wherein $R_4$ and $R_6$ are a divalent organic group; $R_5$ and $R_7$ are a monovalent organic group; and q and r are an integer of 1 or more.

5. A fiber-optic sensing system according to claim 2, wherein $R_1$ is represented by the formula:

(II)

6. A fiber-optic sensing system according to claim 1, wherein said sensing part is sensitive to pressure by placing the optical fiber so as to be bent depending on the pressure in the object to be measured.

7. A fiber-optic sensing system according to claim 1, wherein said sensing part is sensitive to temperature by placing the optical fiber so as to make the light signal receive Raman scattering depending on the temperature in the object to be measured, and two kinds of scattered light from said sensing part transmitted through the signal transmitting path via an optical coupler is detected.

8. A fiber-optic sensing system according to claim 6, wherein said sensing part is a pressure sensing part formed in a closed space connected to a cylinder in an internal combustion engine, each pressure sensing part connected to each cylinder and the signal transmitting path connecting each pressure sensing part are installed in a head gasket to detect the pressure in each cylinder through said signal transmitting path.

9. A fiber-optic sensing system according to claim 1, wherein said sensing part is sensitive to temperature and placed in a wall of a building.

10. A fiber-optic sensing system according to claim 1, wherein the coating material has a thickness of 4 to 20 μm.

* * * * *